F. D. POWELL.
CARRIER.
APPLICATION FILED JUNE 4, 1910.
1,111,859.
Patented Sept. 29, 1914.
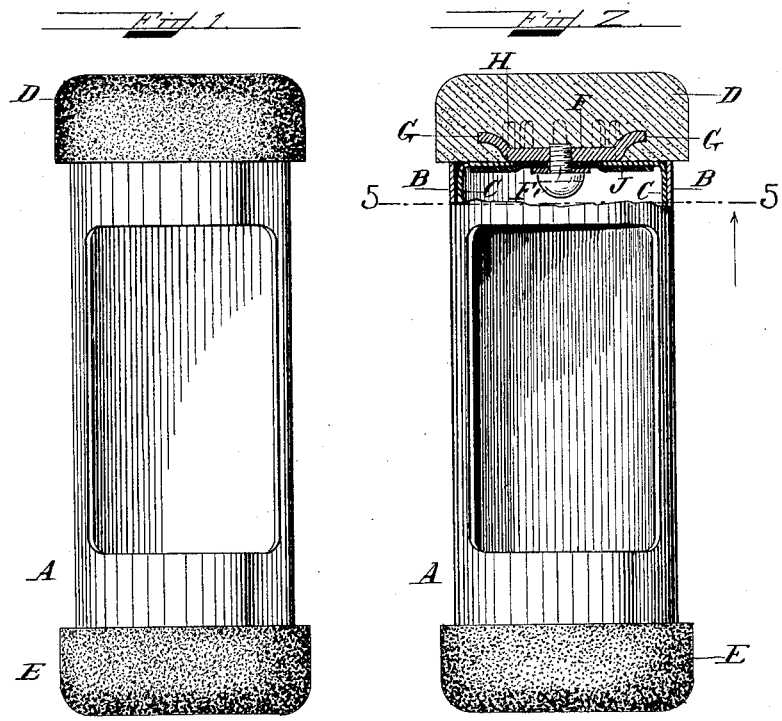
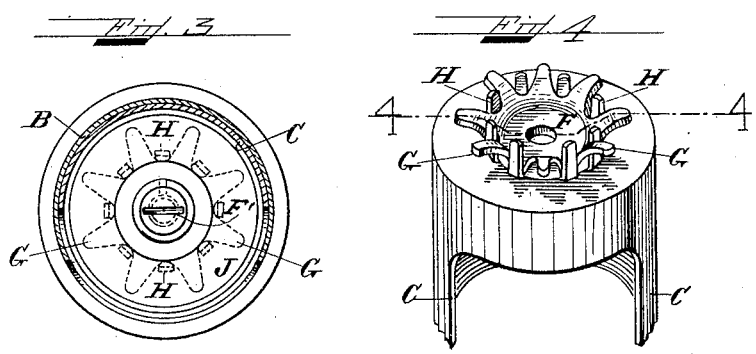
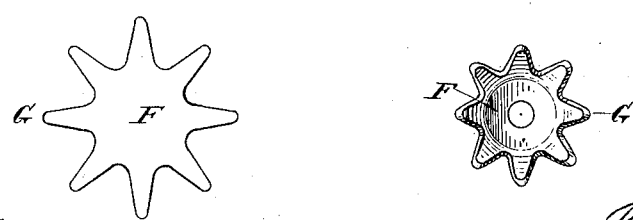
Witnesses
H. E. Remick
L. C. Easton
Inventor
Frank D. Powell
By J. S. Kush
Atty

UNITED STATES PATENT OFFICE.

FRANK D. POWELL, OF LOWELL, MASSACHUSETTS, ASSIGNOR TO THE LAMSON COMPANY, OF NEWARK, NEW JERSEY, A CORPORATION OF NEW JERSEY.

CARRIER.

1,111,859.  Specification of Letters Patent.  Patented Sept. 29, 1914.

Application filed June 4, 1910. Serial No. 564,938.

*To all whom it may concern:*

Be it known that I, FRANK D. POWELL, of Lowell, in the county of Middlesex and State of Massachusetts, have invented certain new and useful Improvements in Carriers, of which the following is a specification.

My invention relates to carriers adapted for use in pneumatic despatch tube apparatus for the transporting of cash or memoranda from the salesman's station to the cashier and the return of the same.

Figure 1 is a side elevation of a carrier embodying my improvement. Fig. 2 is a similar view of Fig. 1 with part of the shells and one of the heads in section taken on the line 4—4 Fig. 4. Fig. 3 is a horizontal cross section taken on the line 5—5 Fig. 2. Fig. 4 is a perspective view of one of the shells of the carrier showing the star nut in its position on the shell. Fig. 5 is a plan view of the star nut. Fig. 6 is a similar view of the star nut after it has been formed up.

Like letters of reference refer to like parts throughout the several views.

A represents a carrier provided with buffer heads D and E and rotatably telescopic shells B and C. These shells are adapted to be rotated to open up the interior of the carrier to receive money or memoranda after which the shells B and C are rotated to close the opening when the carrier is in condition for despatch through the pneumatic tube.

The star nut F is blanked out by a punch press and is the shape shown in Fig. 5, after which it is formed up into a flaring shape on a punch press as shown in Fig. 6. The flaring shaped star nut is then placed onto the inner side of the felt head and struck with the punch press, and owing to the shape of the teeth G as shown in Fig. 6 they will spread out under the blow and lock themselves into the felt and assume the position shown in Fig. 2.

The shells B and C are provided with projecting prongs H which correspondingly number to the spaces between the teeth G of the star nut as shown in Fig. 4. As the star nut and teeth H are similar on both ends it will be sufficient to describe simply one of these arrangements which is illustrated in Fig. 2. These prongs H fit in between the prongs G of the nut F after it has been fixed into the felt head as indicated in Fig. 2. After the buffer D has been attached to the shell C a metallic washer J is brought up into direct contact with the star nut F and the same are firmly held in contact with one another by a suitable screw F'. This direct contact of the two metals is advantageous in that it avoids the breaking of the screw nuts which is apt to take place when felt or other material is inserted between the two pieces of metal. By means of my invention solid felt heads can be used; also attachment of the head to the shells is greatly simplified. The construction prevents the felt head from turning, owing to the engagement of the prongs with the metal star nut which is forced into the felt head. The star nut bearing tightly against the inner metallic washer holds the felt head rigidly to the carrier shells and prevents any end or longitudinal movement of the head. The metallic star nut is firmly held in the felt head owing to its being driven therein under pressure. The prongs fit snugly between the teeth of the star nut and are held rigidly in position by means of the screw F' which tightens the buffer head and holds it tight down on the shell. The location of the prongs between the teeth also provides for taking up the twisting strain on the buffer heads for opening and closing the shells.

Having thus described the nature of my invention and set forth a construction embodying the same, what I claim as new and desire to secure by Letters Patent of the United States is:

1. In a carrier, a buffer head provided with a metallic member embedded therein and having spaced teeth, a shell provided with prongs adapted to pass between the teeth of said metallic member, and means for securing said shell to said buffer head.

2. In a carrier, a buffer head provided with a flaring metallic member embedded therein and having spaced teeth, a shell provided with prongs adapted to pass between the teeth of metallic member, and means for securing said shell to said buffer head.

3. In a carrier, a buffer head provided with a metallic member embedded therein, a shell to which said buffer head is adapted to be secured, a washer adapted to be brought into contact with said metallic member, and means for securing the washer in direct contact with said metallic member and for holding the shell and buffer head together.

4. A carrier comprising a shell and a buffer head provided with a pronged member, the prongs of which are curved and are spaced apart so that the angles subtended between lines drawn through the center of said member and the points of prongs adjacent to each other, are in all cases less than 180°, said prongs being wedged into the material of said head from the side thereof adjacent said shell, said material substantially completely covering and concealing said member, and means for firmly securing said member to said shell.

5. A carrier comprising a shell, a buffer head of cushioning material, for said shell, and means for rigidly uniting said cushioning material to said shell, said means including a plurality of spaced apart, deformed prongs wedged into said material from the side thereof adjacent said shell, said deformed prongs being subjected, at least initially, to greater pressure from said material upon one side of each of said prongs than upon an opposite side of the same and being deformed by being thus wedged into said material so as to grasp said material in the interior thereof.

6. A carrier comprising a shell, a buffer head of cushioning material and means for firmly uniting said buffer head to said shell, said means comprising parts driven into and adapted to grasp said material in the interior thereof, substantially all parts of said means being concealed by said material and the latter being integral throughout.

7. A carrier comprising a shell provided with a buffer head of yielding cushioning material having attached thereto a pronged member, the prongs of which are driven into said cushioning material and deformed by the unequal lateral pressure exerted thereagainst by said material when being driven thereinto.

In testimony whereof, I have signed my name to this specification in the presence of two subscribing witnesses, this 1st day of June A. D. 1910.

FRANK D. POWELL.

Witnesses:
LOUISE C. EASTON,
FRED. P. IRISH.

---

Copies of this patent may be obtained for five cents each, by addressing the "Commissioner of Patents, Washington, D. C."